Oct. 3, 1961 — C. J. STALEGO ET AL — 3,002,224
APPARATUS FOR PRODUCING FIBERS
Filed July 22, 1955 — 9 Sheets-Sheet 1
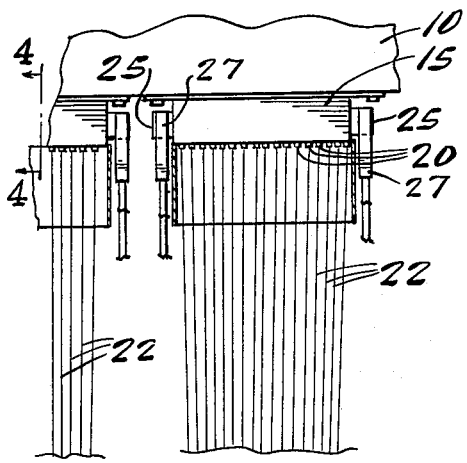
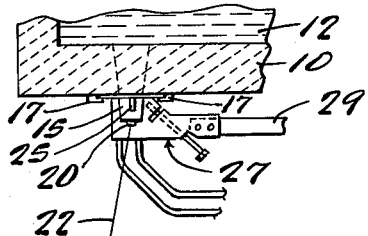
FIG-2-
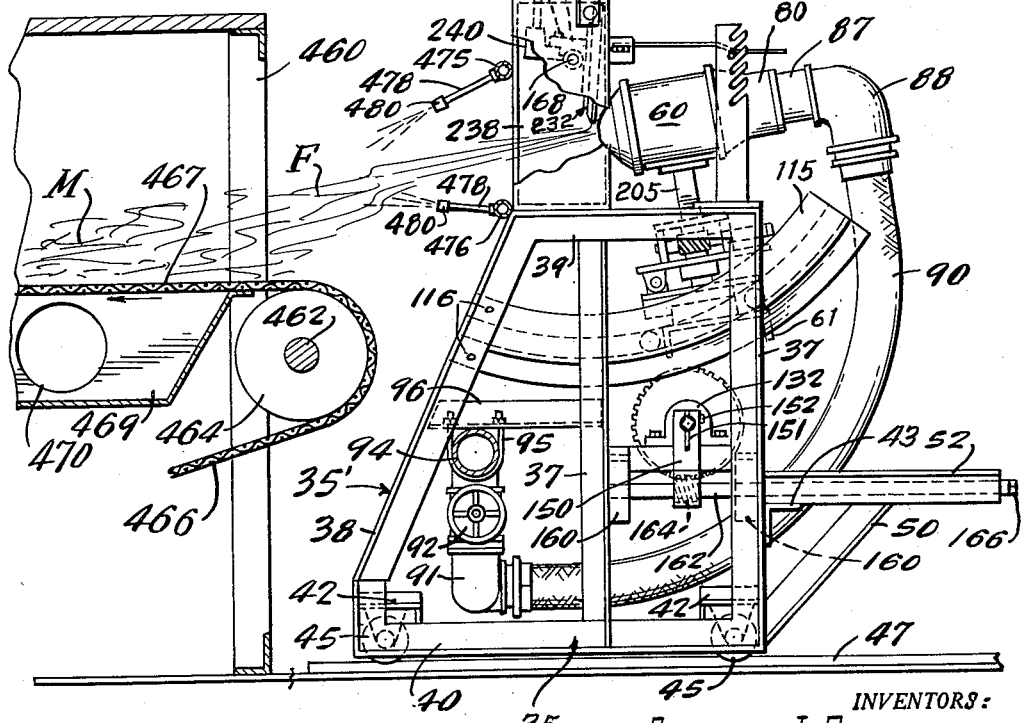
FIG-1-
INVENTORS:
CHARLES J. STALEGO,
BY HAROLD E. LEAMAN.
ATTYS.

Oct. 3, 1961 C. J. STALEGO ET AL 3,002,224
APPARATUS FOR PRODUCING FIBERS
Filed July 22, 1955 9 Sheets-Sheet 2
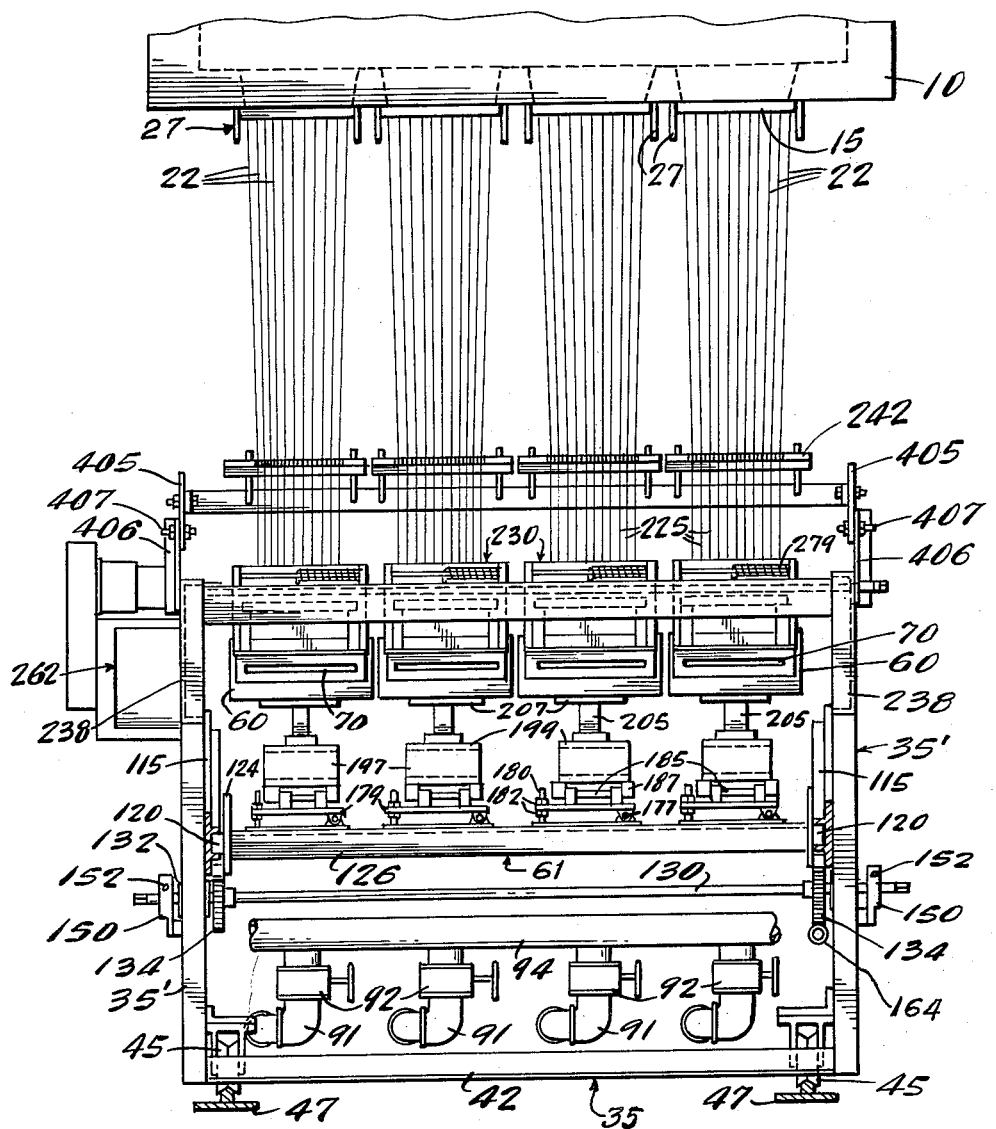
FIG-3-
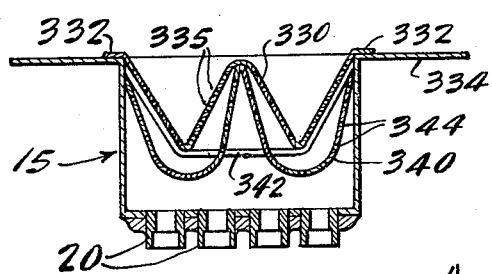
FIG-4-
INVENTORS:
CHARLES J. STALEGO,
BY HAROLD E. LEAMAN.
ATTYS

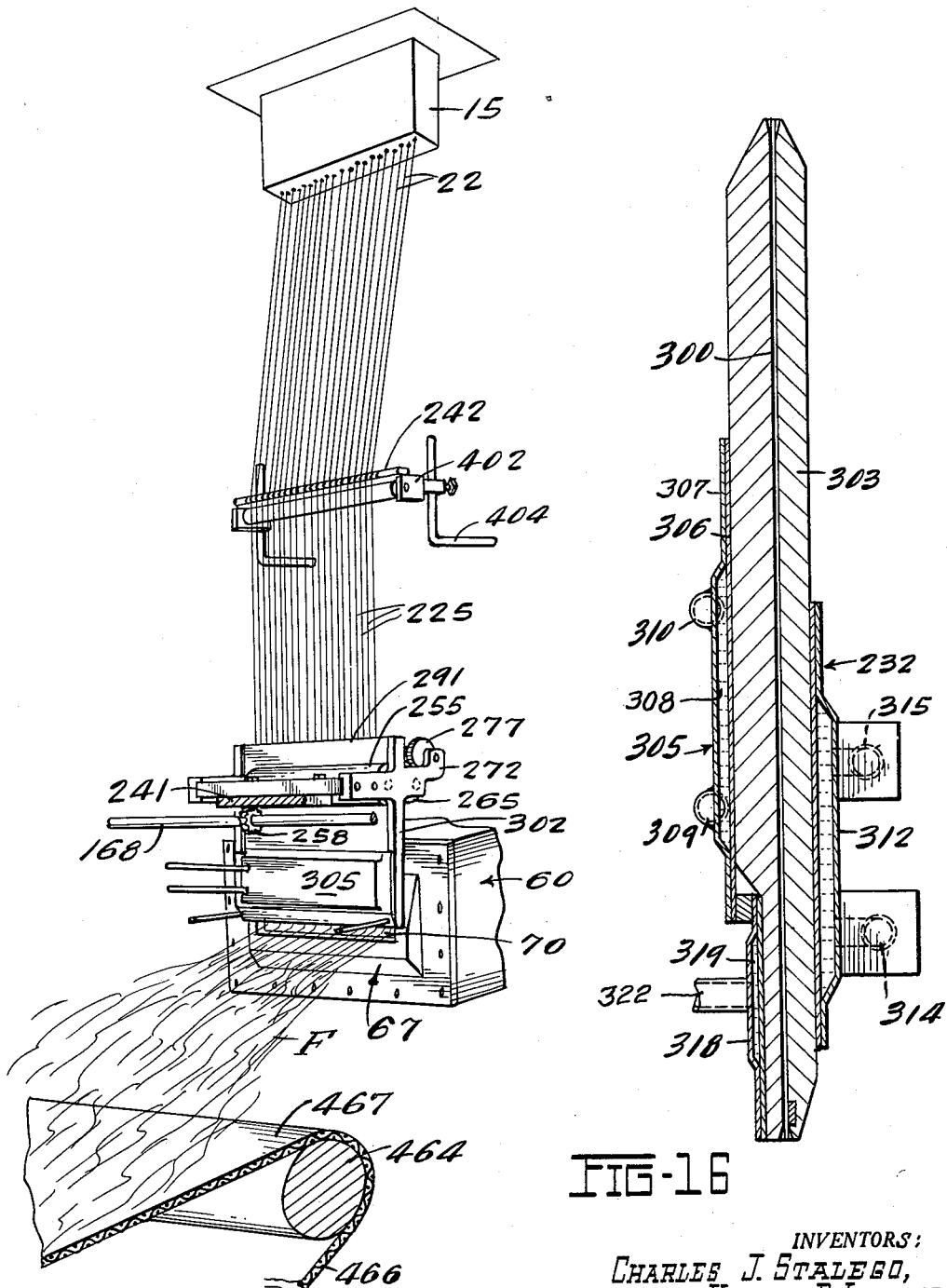

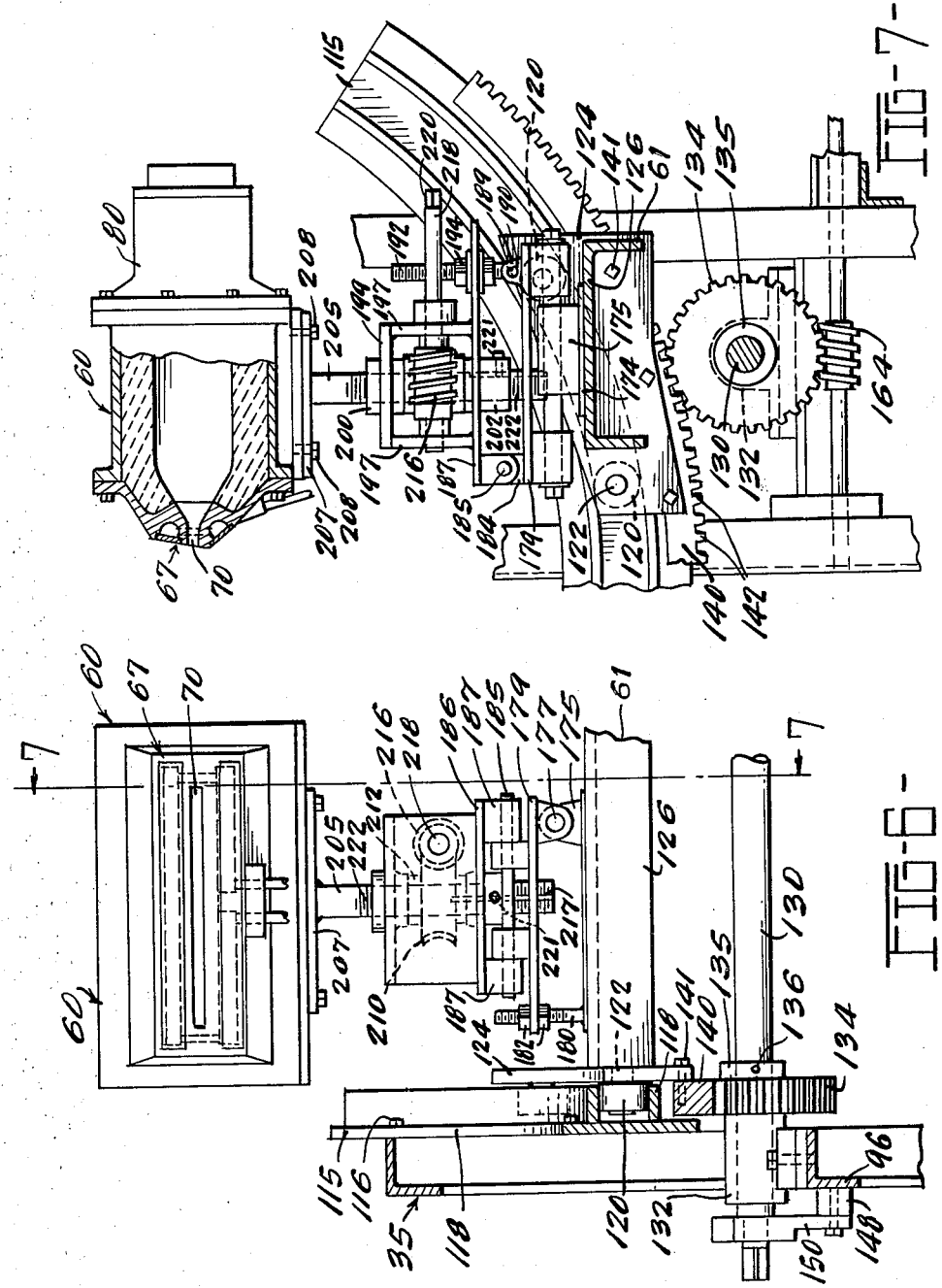

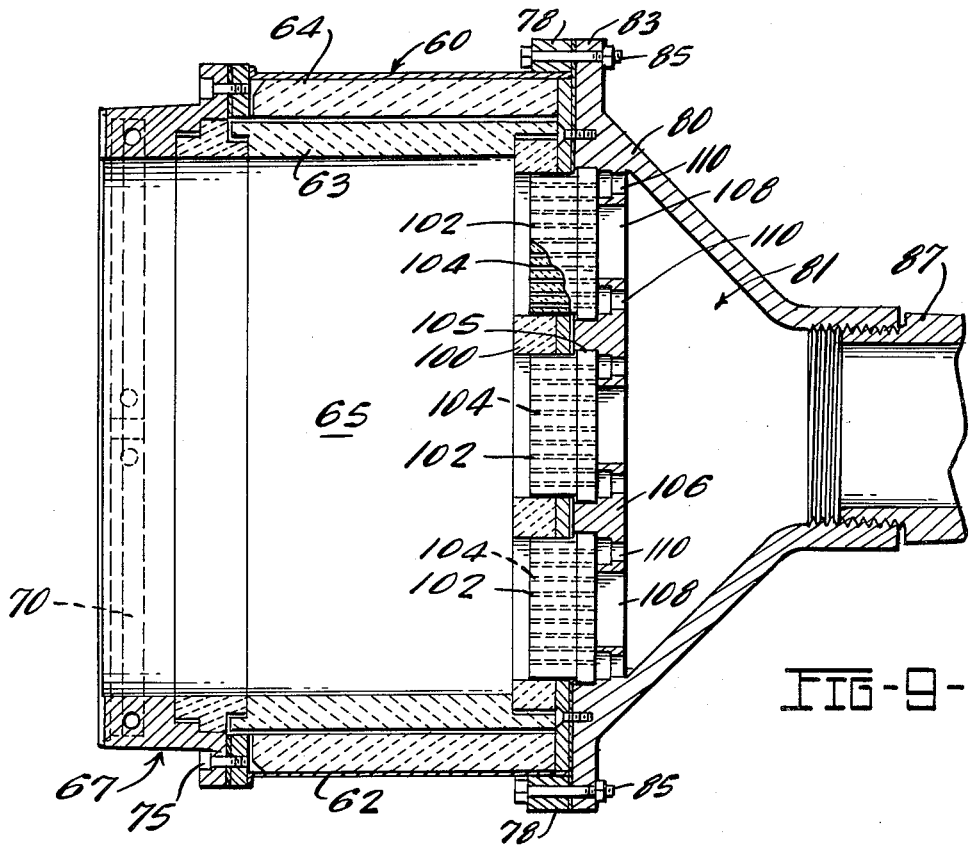
FIG-9-
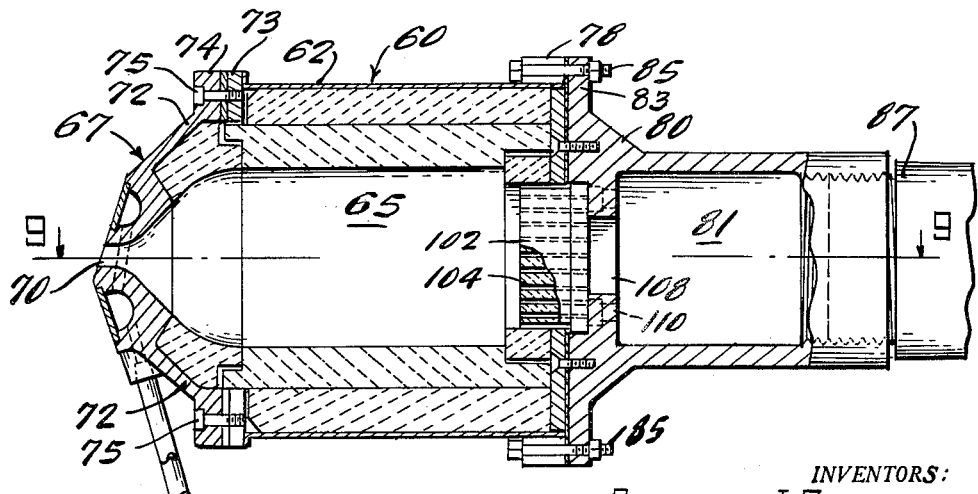
FIG-8-
INVENTORS:
CHARLES J. STALEGO,
BY HAROLD E. LEAMAN
ATTYS.

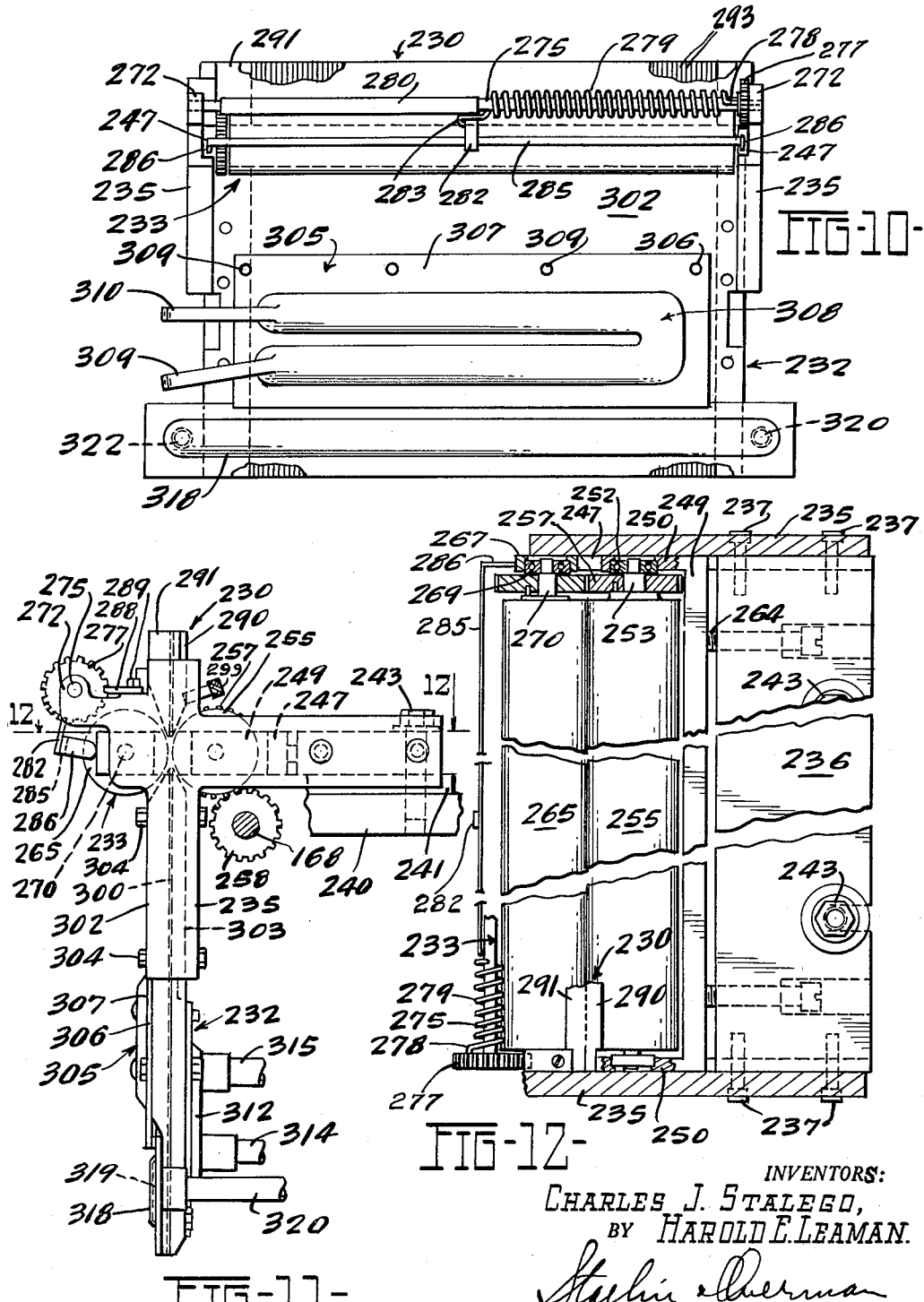

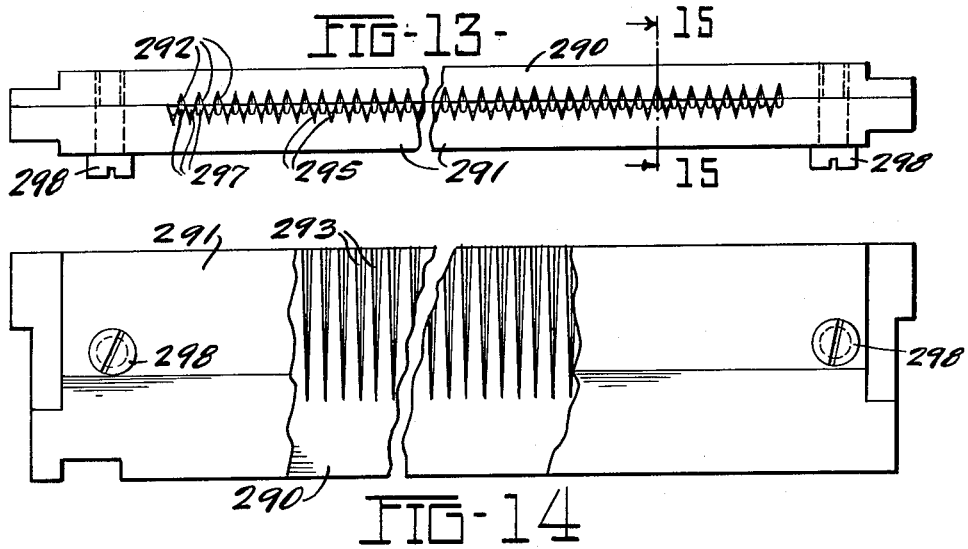
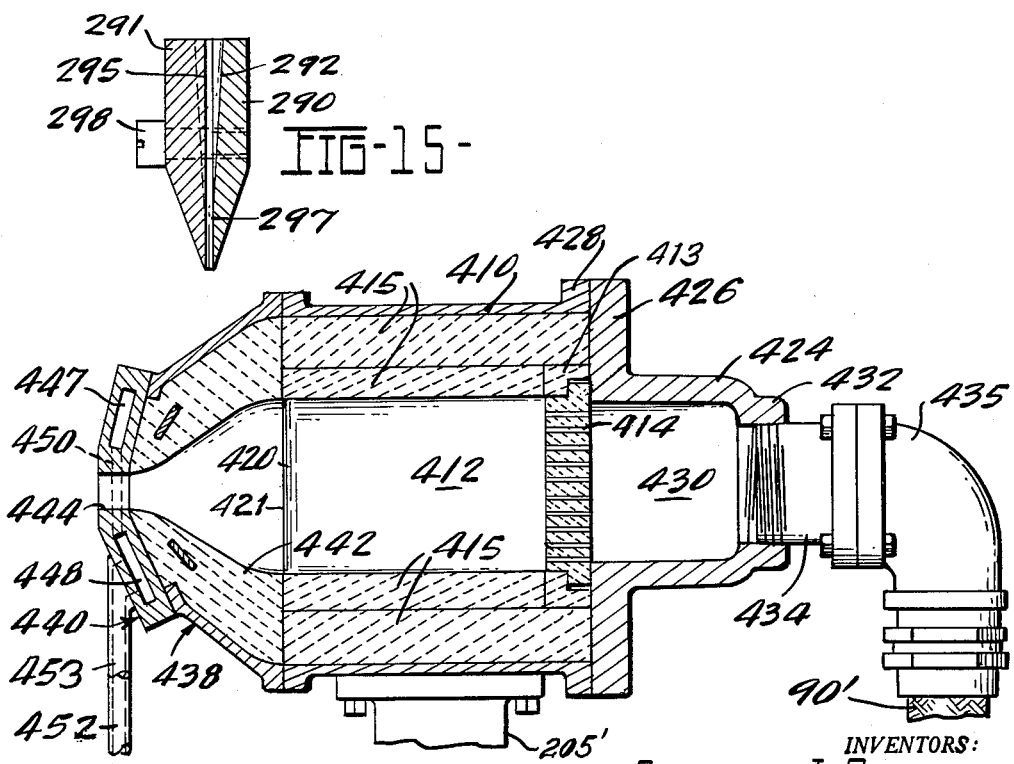

Oct. 3, 1961  C. J. STALEGO ET AL  3,002,224
APPARATUS FOR PRODUCING FIBERS
Filed July 22, 1955  9 Sheets-Sheet 8
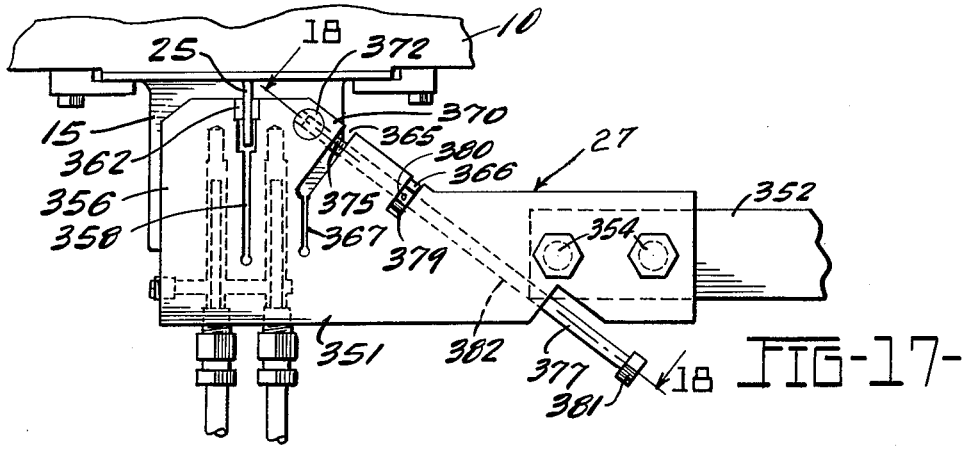
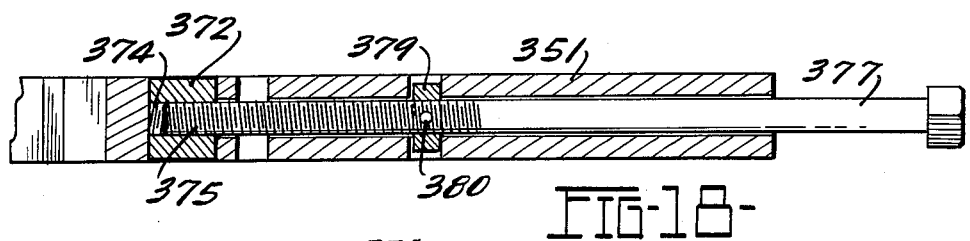
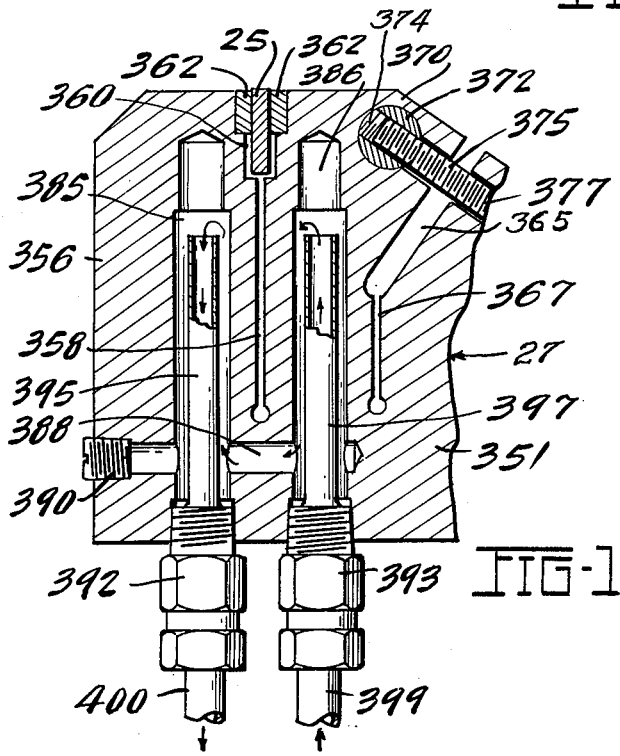
INVENTORS:
CHARLES J. STALEGO,
BY HAROLD E. LEAMAN.
ATTYS.

Oct. 3, 1961        C. J. STALEGO ET AL        3,002,224
APPARATUS FOR PRODUCING FIBERS
Filed July 22, 1955                    9 Sheets—Sheet 9
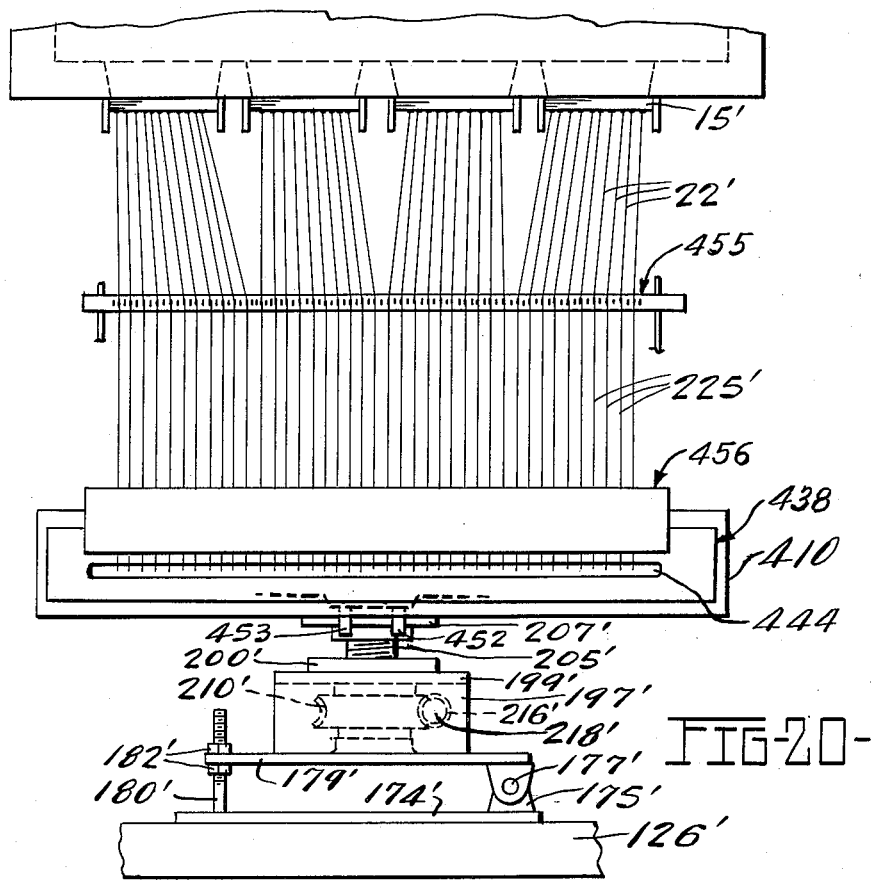
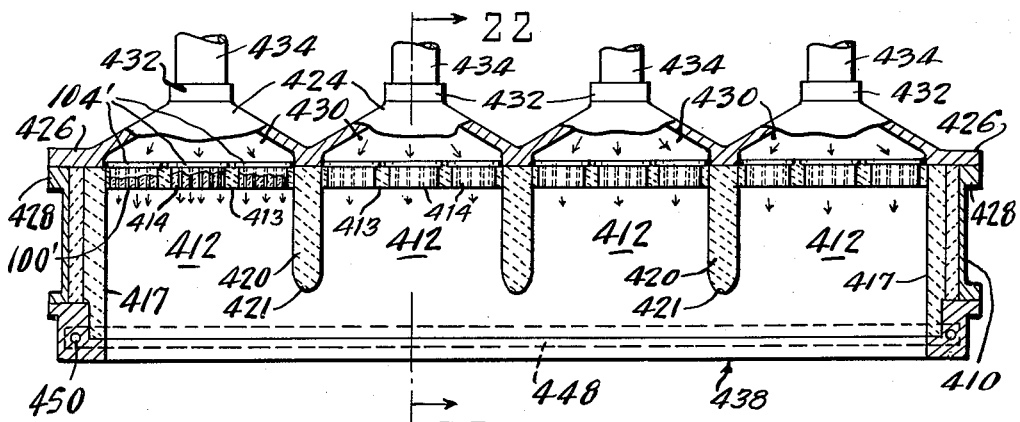
INVENTORS:
CHARLES J. STALEGO,
BY HAROLD E. LEAMAN.
ATTYS.

United States Patent Office 3,002,224
Patented Oct. 3, 1961

3,002,224
APPARATUS FOR PRODUCING FIBERS
Charles J. Stalego and Harold E. Leaman, Newark, Ohio, assignors to Owens-Corning Fiberglas Corporation, a corporation of Delaware
Filed July 22, 1955, Ser. No. 523,753
3 Claims. (Cl. 18—2.5)

This invention relates to apparatus for forming fibers and more particularly to apparatus for attenuating glass filaments to fine fibers through the utilization of intensely hot, high velocity gaseous blasts.

Glass fibers have been manufactured commercially by utilizing a comparatively small internal combustion burner in which a combustible mixture is substantially completely burned and the gases of combustion discharged through a restricted orifice as a high velocity blast into which is projected a comparatively small number of glass rods or primary filaments. The heat from the gases softens the ends of the rods or primaries and the velocity of the gases of the blast attenuates the softened material to fibers.

An arrangement of one or more burners of this character has been utilized to produce fibrous mats on a commercial basis but the method has been costly to carry on and the mats made by the process are very expensive. Furthermore, the amount of glass that may be attenuated through the use of small combustion burners is comparatively low so that it has been virtually impossible to attain manufacture of production quantities of fibers on an economically commercial scale.

A battery or group of small burners operating simultaneously have been used to produce fibrous mats of considerable width but the burner constructions have thick refractory walls defining their combustion chambers and with the metal shells surrounding the refractory, the dimensions preclude a close spacing of the burner orifices through which the fiber attenuating blasts are projected. Therefore, due to the substantial spacing of the orifices, the attenuating blasts attenuate glass rods or filaments to fibers in the spaced zones and the deposition of fibers upon a collecting surface is nonuniform as the fibers entrained in the individual blasts tend to be deposited in ridges or rows.

Furthermore, the orifices of the small burners are of limited width and the blasts are able to attenuate only limited quantities of glass or other mineral material into fibers whereby the formation of fibrous mats by this method is very costly.

Furthermore, difficulties have been encountered in endeavoring to attain substantially uniform or constant operating characteristics of a plurality of small burners by reason of the small volumes of the combustion chambers, and because the dimensional characteristics of the small restricted orifices through which the gases are projected are critical. A minute or small crazing, erosion or wearing away of the refractory defining the orifice of a small burner vitally affects the characteristics of the blast such as reduction of gas velocity of the blast or impairment of gas velocities in certain zones of the blast. Velocities of the gases in the blast have a direct bearing on the size and length of the fibers attenuated by the blast.

Thus control of the size and length of fibers has been difficult especially in installations where a series of such burners are operated simultaneously to produce a mat of substantial width by reason of the critical operating characteristics of small burners resulting in fibers of nonuniform size as well as an uneven distribution of the fibers on the fiber collecting surface.

The present invention embraces producing fibers through attenuation by a gaseous medium of a temperature above the softening or melting temperature of the fiber forming material, the gaseous medium being in the form of a comparatively thin, sheet-like, high velocity gaseous blast of substantial width whereby high production of fine fibers of substantially uniform size may be economically attained.

The present invention also embraces forming fibers from heat-softenable material through the utilization of one or more streams of gases of a temperature well above the softening temperature of the fiber-forming material moving at high velocities forming a sheet-like attenuating blast of a width substantially equivalent to the width of a mat desired to be formed from the fibers attenuated by the blast.

The present invention further embraces burning combustible mixtures in a plurality of juxtaposed confined zones and discharging the products of combustion from the confined zones through restricted orifice or outlet means as a high velocity, high temperature blast of substantially continuous width.

An object of the invention is the provision of an apparatus for forming fibers from heat-softenable mineral materials embodying a plurality of combustion chambers adapted to burn combustible mixtures under confined conditions, the chambers being arranged to discharge the gases of combustion through an orifice means providing a sheet-like blast, the arrangement embodying means for delivering a large number of filaments of fiber-forming material into the blast throughout its width whereby the filaments are softened by the heat of the blast and the softened material attenuated by the velocity of the gases of the blast to fine fibers.

Another object of the invention is the provision of a mounting means for a blast producing burner which is arranged to provide limited universal movement for the burner in order to establish correlation of the high velocity gaseous blast with the fiber-forming material feeding means and the fiber collecting means.

Another object of the invention is the provision of a plurality of combustion chambers wherein each chamber is capable of limited universal movement relative to adjacent chambers and wherein all of the chambers may be adjusted to change the direction of flow of the gases of the blast from the chambers.

Another object of the invention resides in the provision of a novel means for feeding and guiding a comparatively large number of filaments of fiber-forming material into the blast in a manner wherein each filament is spaced from adjacent filaments to facilitate the attenuation of each filament to fibers independently of adjacent filaments.

Another object is the provision of a feeder construction for delivering streams of molten fiber-forming material to form primary filaments wherein the temperature of the material is maintained and controlled by flow of electric current through the feeder construction, the latter being equipped with a current connector or terminal clamp of a character assuring constant current flow at high operating temperatures.

Another object is the provision of a feeder construction for discharging streams of molten fiber-forming material embodying screening means for retaining stria, cords or particles of unrefined material from discharge until they are dissolved, refined or conditioned for discharge from the feeder construction.

Further objects and advantages are within the scope of this invention such as relate to the arrangement, operation and function of the related elements of the structure, to various details of construction and to combinations of parts, elemnets per se, and to economies of manufactur and numerous other features as will be apparent from a consideration of the specification and drawing of a form of the invention, which may be preferred, in which:

FIGURE 1 is a side elevational view of an apparatus of the invention for forming fibers from heat-softenable mineral materials;

FIGURE 2 is a front elevation illustrating a current conducting arrangement associated with a fiber-forming material feeder forming a part of the apparatus shown in FIGURE 1;

FIGURE 3 is a front elevational view of the fiber-forming apparatus illustrated in FIGURE 1;

FIGURE 4 is a sectional view through a feeder showing a material screening means therein, the view being taken on the line 4—4 of FIGURE 2;

FIGURE 5 is an isometric semi-diagrammatic view illustrating the method and means of delivering bodies of fiber-forming material to a gaseous attenuating blast;

FIGURE 6 is a front elevational view with certain parts in section particularly illustrating a form of blast burner supporting means;

FIGURE 7 is a sectional view taken substantially on the line 7—7 of FIGURE 6;

FIGURE 8 is an enlarged vertical sectional view through one of the blast burners of the fiber attenuating apparatus shown in FIGURE 1;

FIGURE 9 is a transverse sectional view through the burner, the view being taken substantially on the line 9—9 of FIGURE 8;

FIGURE 10 is an elevational view of a filament guiding arrangemnet forming a part of the invention;

FIGURE 11 is a side elevational view of the filament guiding means shown in FIGURE 10;

FIGURE 12 is a sectional view taken substantially on the line 12—12 of FIGURE 11;

FIGURE 13 is a top plan view of the upper filament guide;

FIGURE 14 is an elevational view of the structure shown in FIGURE 13, certain parts being broken away for purposes of illustration;

FIGURE 15 is a sectional view taken substantially on the line 15—15 of FIGURE 13;

FIGURE 16 is a vertical sectional view through the lower filament guide means for the primary filaments;

FIGURE 17 is an elevational view of a current conductor attaching means for the feeder;

FIGURE 18 is a sectional view taken substantially on the line 18—18 of FIGURE 17;

FIGURE 19 is a fragmentary vertical sectional view illustrating a means for cooling the current conductor shown in FIGURES 17 and 18;

FIGURE 20 is a view similar to FIGURE 3, showing modified form of burner construction of the invention;

FIGURE 21 is a horizontal sectional view through the burner shown in FIGURE 20, and FIGURE 22 is a vertical sectional view taken substantially on the line 22—22 of FIGURE 21.

While the apparatus illustrated is especially usable for forming fibers from glass, it is to be understood that the apparatus may be utilized for forming and processing fibers from other heat-softenable mineral materials, such as fusible rock, slag and the like which may be converted to fibers by attenuating forces. Referring to the drawings and initially to FIGURES 1 and 3, there is illustrated an arrangement and apparatus for forming fibers from heat-softenable mineral materials and directing the formed fibers onto a collecting surface, the collected fibers forming a mat or other fibrous product.

The appartaus will be described herein as especially adapted for forming fibers from glass and to this end a forehearth 10 is illustrated containing a supply of molten glass 12 The forehearth 10 is connected to a suitable melting furnace or tank (not shown) adapted to contain glass batch which is heated in the furnace to effect its reduction to a molten state, the molten glass flowing from the furnace into the forehearth by a suitable channel (not shown).

Disposed beneath the forehearth 10 and secured thereto is a plurality of feeders or bushings 15 which are attached to the lower or bottom wall of the forehearth by a suitable securing means 17. Each of the feeders 15, which will be hereinafter described in further detail, is provided with a comparatively large number of tips or orifice members 20 through which streams 22 of glass are flowed or discharged as shown in FIGURES 1, 2 and 3.

The feeders 15 are preferably electrically heated to facilitate the exercise of accurate control of the temperature and hence viscosity of the glass in the feeder at the zone of discharge of the glass therefrom. The feeders 15 are preferably formed of high temperature resistant metal such as platinum rhodium or the like and each feeder is formed at its ends with projections or terminals 25. Each of the terminals 25 is adapted to be engaged by a connector or terminal clamp 27 which is coupled with a buss bar 29 adapted to carry electrical current to the feeder. The construction of the terminal clamp or connector 27 will be hereinafter described in further detail.

The streams 22 of glass are drawn or attenuated into primary filaments or bodies which are delivered by suitable guide means into a high temperature, high velocity attenuating blast or blasts. The blast producing means and the filament attenuating and guiding means is mounted upon a suitable frame or support 35 shown in FIGURES 1 and 2. The frame 35 is formed with end sections comprising upright members 37, diagonally arranged members 38 and transverse upper and lower members designated 39 and 40 respectively. The end frames or sections 35' are joined together at their lower zones by transversely extending bars 42, the frame structure being provided with casters 45 which engage rails 47, the latter forming a track to facilitate movement of the apparatus toward or away from the fiber collecting zone or area.

The frame structure is inclusive of upwardly and rearwardly extending struts 50 which with a transverse member 43 support an operator's platform 52 to facilitate inspection and observation of the burner construction and the filament advancing and guiding means.

An important feature of the invention is the provision of large capacity internal combustion chambers for producing the gaseous blasts for fiber attenuating purposes. In the embodiment illustrated in FIGURES 1 and 3, there is a plurality of combustion chambers, each enclosed in an individual casing, each unit being referred to as a burner. As shown in FIGURE 3, there are four burner chambers, each having a comparatively long slot or restricted orifice through which gases forming the blast are projected. The burners are arranged in transverse aligned relation and the orifices or slots in the several burners are in juxtaposed end to end relation, such that the several slots, projecting high temperature, high velocity gases, provide substantially a sheet-like blast of a width approximately equal to the combined widths of the burners, and which is capable of attenuating large quantities of glass to fibers.

The burners 60 are supported upon a carriage or primary support 61 movably mounted on the frame 35 and each burner is provided with an individual mounting means connected to the carriage 61 so as to be capable of individual adjustment relative to the carriage, the arrangement being such that the burners may be moved simultaneously by adjusting the relative position of the carriage. One of the burners 60 is illustrated in detail in FIGURES 8 and 9. Each of the burners is inclusive of a metal shell or casing 62 of generally rectangular shape elongated in a transverse direction.

Disposed within the burner casing 62 are layers of high temperature refractory 63 and 64, the inner layer 63 defining a generally rectangular combustion zone or chamber 65. The front portion of the burner is provided with a nose section 67 including a metal member or plate 72 lined with refractory and provided with a restricted orifice means or slot 70 elongated in a transverse direction through which gases from the chamber 65 are discharged. The metal casing 62 and member 72 are formed respectively with mating flanges 73 and 74 adapted to receive securing bolts 75 for fastening the nose or orifice section 67 to the burner casing 62.

Secured to the rear portion of the metal shell or casing 62 is a flange 78. Disposed at the rear of each of the burners is a member 80 providing a manifold 81, the member 80 having a flange portion 83 which mates with and is secured by means of bolts 85 to a flange 78 welded to the casing 62. Each manifold 81 is adapted to be connected with a supply of combustible mixture for the burner and for this purpose the manifold is joined by means of a coupling 87 with an L 88 to which is connected a flexible hose or tube 90, the latter being connected by an L 91 with a mixture control means or valve 92.

The valve 92 is connected with a primary manifold or tube 94 supported upon a frame member 96 by means of U-bolts 95, the tube 94 being connected with a supply of air and fuel gas mixture. The manifolds 81 of the several burners 60 are connected with the supply manifold 94 through the flexible hose and valve arrangement above described and shown in FIGURES 1 and 3.

Disposed between each manifold 81 and the adjacent combustion chamber 65 is a wall 100 having circular openings 102 formed therein. Disposed in each of the openings is a fire screen or perforated member 104 which may be formed of refractory or metal, the members 104 being held in place by a wall portion 106 of the manifold member 80. The wall portion 106 adjacent each of the screens 104 is formed with a circular opening 108 which is bounded by an annular group of circular openings 110 of smaller diameter surrounding each of the larger openings 108.

Each of the members 104 is formed with a ledge or flange 105 which is engaged by wall portions 106 of the manifold member 80 securing the screen members 104 in the openings 102. Each member 104 is formed with a plurality of small openings, passages or perforations which form a fire screen preventing preignition of the combusible mixture in the manifold chamber 81.

The large openings 108 and the annular groups of smaller openings 110 provide passages for flow of combustible mixture from the manifold chamber 81 through the small passages in member 104 into the combustion chamber 65. While the openings 102 and the screen members 104 are preferably of circular shape it is to be understood that they may be of rectangular configuration or other suitable shape if desired.

The combustion chamber 65 is elongated transversely to form a substantially rectangularly shaped combustion zone in cross section and the restricted orifice 70 is a substantially continuous slot having parallel walls and of a cross sectional area many times less than the cross-sectional area of the combustion chamber 65. The ratio of the cross-sectional area of the combustion chamber to the cross-sectional area of the orifice or slot 70 may be from 12 to 1 to 4 to 1.

One of the features of the invention is to provide a wide sheet like gaseous blast so a large number of primary filaments, rods or bodies of glass or other mineral material may be simultaneously advanced and delivered endwise into the blast whereby the ends of the filaments or bodies are softened by the heat of the blasts, the high velocity of the gases of the blast attenuating the softened material to fibers.

In operation of each of the burners or combustion chambers, the mixture of fuel gas, such as methane, propane or butane, and air or other oxidant, is delivered to the burner manifold 81 under a low pressure of from three to ten pounds p.s.i. the rate of delivery of the mixture being controlled by a valve 92, there being an individual valve to control the mixture supplied to each of the burners or chambers. The combustible mixture in the manifold 81 enters the combustion chamber or zone 65 and is ignited therein, the mixture being substantially completely burned within the combustion chamber or confined zone 65.

The burning gases within the chamber 65 undergo great expansion and develop intense heat of a temperature of 3000° F. or more. The walls of refractory defining the combustion chamber and the nose portion of each burner become heated to incandescence, a factor which further accelerates flame propagation and burning of the mixture within the chamber. The intensely hot burned gases or products of combustion are discharged through the orifice or slot 70 as an intensely hot, high velocity gaseous blast of a temperature well above the softening or attenuating temperature of the glass or other fiber-forming material so as to soften the fiber-forming material which is attenuated by the high velocities of the gases into fine fibers of diameters of from one-half micron to four microns in size.

It is to be understood that while the bulk of the attenuated fibers are within the above specified size range there may be some fibers of a size greater than four microns.

As shown in FIGURE 3, the burners 60 are arranged substantially in transverse alignment and are disposed close together. The juxtapositioning of the burners enables the production of a sheet-like blast formed from the high velocity gas streams of burned gases from the chambers 65 projected through the restricted orifices 70. The sheet-like blast is of substantially uniform cross-sectional area throughout its width which is defined by the outer ends of the orifices 70 of the outermost burners 60 of the group.

In the apparatus illustrated in FIGURES 1 and 3, each of the burners 60 is mounted in a manner capable of limited universal movement or adjustment, the burners and universal mounting means therefore being supported upon the frame 35 in a manner to facilitate simultaneous angular movement of all the burners. The arrangement for supporting or mounting the burner constructions is illustrated in FIGURES 1, 3, 6 and 7. Secured to each of the end sections of the frame 35 is a curved or arcuately shaped plate or member 115 secured to the frame construction by means of bolts 116.

Welded or otherwise secured to one side of each of the plates 115 is a pair of arcuately shaped or curved members or bars 118, the bars of each pair being spaced as shown in FIGURE 6 forming an arcuate track at each end section adapted to accommodate rollers 120 mounted upon stub shafts 122 secured to plates 124.

Welded or otherwise secured to the plates 124, which are disposed adjacent the plates 115, is a transversely extending channel shaped member 126 which forms a component of the carriage 61 for the burners and the individually adjustable mounting means for each of the burners. Each plate 124 is provided with two stub shafts 122 carrying the rollers 120, the rollers operating in the arcuate track provided by the pairs of spaced bars 118.

Extending transversely of the burner supporting frame is a shaft 130 journalled in suitable bearings 132 carried by the end frame sections. Mounted upon the shaft 130 is a pair of gears 134, each of said gears being disposed adjacent one of the end frame sections. Each gear 134 is formed with a hub portion 135 provided with a threaded member 136 or other locking means for securing the gears 134 to the shaft 130. Secured to each of the plates 124 is a gear section or sector 140 held in place by means of bolts 141.

Each of the member 140 is of arcuate configuration and has an arcuate surface formed with rack or gear teeth 142 which mesh with the teeth of one of the gears 134 as shown in FIGURES 1, 3, 6 and 7. When shaft 130 is rotated, gears 134 are rotated causing movement of the carriage 61 relative to the stationary frame structure 35 for simultaneously moving all of the burners 60 to a desired angular position.

Secured to a transverse member 96 of each of the end frames is a spacer or block 148 supporting a member 150 shown in FIGURE 6. As shown in FIGURE 1, each member 150 is formed with a slot 151 and adjacent portions of the member are provided with aligned openings to receive a bolt 152 which may be drawn up to lock the shaft 130 in adjusted position.

Bearings 160 supported on one of the end sections of frame 35 journally supports a shaft 162 equipped with a worm 164 meshing with the teeth of one of the gears 134. The extremity or end zone 166 of the shaft 162 is of square or polygonal cross-section adapted to receive a crank or other suitable tool for rotating shaft 162 to rotate the worm 164, shaft 130 and gears 134 to adjust the angular position of the burners and their mounting means.

The center of arcuate movement of the primary burner supporting means is the axis of a shaft 168 which drives feed roll mechanism for advancing the glass filaments or bodies into the blast. Through this arrangement the burners may be moved to various angular positions relative to the stationary frame 35.

Disposed between each of the burner constructions 60 and the channel member 126 is an adjustable mounting means constructed to facilitate limited universal movement or adjustment of the burner relative to the supporting member 126. The burner mounting arrangement is particularly illustrated in FIGURES 6 and 7. While a description of a mounting for one of the burners will be set forth herein, it is to be understood that each burner is supported upon the channel shaped member 126 by the same or similar means.

Mounted upon the upper surface of the channel shaped support 126 is a member 174 supporting a bearing block 175 bored to receive a shaft 177 upon which a plate 179 is pivotally supported. A threaded member 180 having one end welded to the channel member 126 extends through an opening in plate 179. The threaded member 180 is adapted to receive nuts 182 disposed on each side of the plate 179 for adjusting the angular position of the plate 179 about the axis of the supporting shaft 177.

Plate 179 is formed adjacent one edge zone with upwardly extending lugs or portions 184 which are bored to receive a shaft 185. A second plate 186 disposed above the plate 179 is formed or equipped with depending portions 187 which are bored to accommodate the shaft 185 disposed substantially at a right angle to the shaft 177. The plate 179 is formed with a pair of lugs or portion 189 bored to receive a pin 190 which extends through the end of a threaded member 192, the latter projecting through an opening in plate 187. The threaded member 192 is equipped with adjusting nuts 194 for changing the angular position of plate 187 about the axis of shaft 185.

Formed on the plate 187 is a pair of upwardly extending portions 197 bridged by a member 199 formed with a boss 200. Plate 187 is formed with a boss 202, and both bosses 200 and 202 are bored to receive a shaft or pedestal 205. The pedestal 205 is secured to a plate-like member 207 which is secured to the bottom wall of the burner 60 by means of screws 208.

Surrounding the pedestal shaft or post 205 is a worm wheel 210. Disks or collars 212 and 214 surround the shaft and engage boss portions on plates 187 and 199 respectively, the said collars serving to restrain vertical movement of the worm wheel 210. A worm 216 supported on a shaft 218 is enmeshed with the worm wheel 210, the shaft 218 being journalled in suitable bearings carried by the upwardly extending members 197. The end zone 220 of shaft 218 is of polygonal shape to receive a tool such as a crank for rotating the shaft and worm 216.

The post 205 is provided with a threaded portion 222 and the wall of the opening in the worm wheel 210 is threaded to accommodate the threaded portion 222 of the post 205. The post 205 is formed with a keyway 217 to receive a key 219 carried by the boss 202 and held in place by a set screw 221. This construction serves to prevent relative rotation of the post 205.

Rotation of shaft 218 and worm 216 causes rotation of the worm wheel 210 and, through the threaded interconnection of the worm wheel with post 205, the latter and the burner connected thereto may be elevated or lowered to change or adjust the heighth of the burner. By manipulation of the nuts 182, the lateral angularity of the burner may be adjusted and determined, the pivoting of the burner during such adjustment taking place about the axis of shaft 177.

By manipulation of the nuts 194, the burner construction may be tilted in the direction of its length about the axis of shaft 185 to change the angularity of the burner and hence the direction of the blast in a longitudinal direction. The angular position of all of the burners to change the angularity of the composite or sheet-like blast from all of the combustion chambers or burners is accomplished by rotating the shaft 130 and gears 134 which rotates or rocks the rack 140 and the burner mounting plate 126 about an axis of a shaft 168 shown in FIGURES 1 and 11.

The apparatus is inclusive of means for feeding and guiding the primary filaments or bodies 225 formed from the streams 22 of molten fiber-forming material into the attenuating blast. The arrangement for accomplishing this purpose is illustrated in FIGURES 1, 3, 5 and 10 through 16 of the drawings.

In the form of apparatus wherein each of the interval combustion chambers 65 is contained within an individual burner housing 62 as shown in FIGURE 3, a filament feeding and guiding unit is provided for each burner.

As particularly shown in FIGURES 10, 11 and 12, each unit is inclusive of an upper guide means 230, a lower guide means 232 and a filament feeding or advancing means 233. Each unit is inclusive of frame or supporting members 235 which are secured to a plate or member 236 by means of bolts 237, the ends of the plate fitting into channels or recesses 247 formed in the supporting members or fittings 235.

The filament feeding and guiding units are supported adjacent the burners in the manner illustrated in FIGURE 1. Mounted upon each of the end frame sections of the main frame 35 is an upwardly extending bracket or member 238, the members 238 being connected together by a rail or bar 240. The rail 240 is formed with pad portions 241 (one of which is shown in FIGURE 11) arranged to engage and support the plates 236 of the filament feeding and guiding units. As shown in FIGURES 11 and 12, the plate 236 is formed with slots 242 to accommodate threaded members or bolts 243 which are threaded into openings provided in the pad portion 241 of the rail 240.

As shown in FIGURE 11, the primary filament feeding or advancing means is disposed between the upper and lower filament guiding means. Extending parallel with the plate 236 is a member 249 having laterally projecting portions 250 which are received in the channels or recesses 247 formed in the members 235.

The projecting portions 250 support antifriction bearings 252 in which a shaft 253 is journalled, the shaft carrying a feed roll 255. Mounted upon the shaft 253 is a gear 257 which meshes with a gear 258 secured upon a drive shaft 168. The drive shaft 168 is driven through suitable reduction gearing contained within a housing 262 shown in FIGURE 3 and operated by a motor enclosed within the housing 262. The pate 236 is provided with threaded openings accommodating threaded members 264, the ends of which engage and position the member 249 as shown in FIGURE 12.

Disposed in parallelism with the feed roll 255 is a second feed roll 265, the peripheral surface thereof being in engagement with the surface of roll 255, the rotation of the rolls serving to feed or advance the bodies or filaments 225 of glass through the guide means into the attenuating blast. The roll 265 is illustrated as driven by frictional contact with the power driven roll 255, but it is to be understood that the roll 265 may be positively driven through suitable gearing if desired.

Mounted in the channels 247 of members 235 are blocks or elements 267 in which are mounted bearings 269 journally supporting the shaft 270 which carries the roll 265. The blocks 267 are slidably disposed in the channels in members 235 to facilitate movement of the roll 265 into contact with the roll 255.

Means is provided for resiliently biasing or urging the roll 265 into frictional engagement with the roll 255, the filaments or bodies of glass being disposed between the rolls. The members 235 are formed with projecting portions or ears 272 having openings to receive the end portions of a shaft or rod 275.

Mounted for relative rotatable movement on shaft 275 is a toothed wheel or circularly-shaped ratchet member 277 provided with an opening into which extends an end portion 278 of a coil spring 279, the latter surrounding the shaft 275 and extending a distance of approximately one-half of the length of the shaft as shown in FIGURE 10.

Mounted upon another portion of the shaft 275 is a sheet metal sleeve 280 having a depending portion or projection 282. The opposite end 283 of the spring 279 engages the depending projection 282 as shown in FIGURE 11. Disposed in substantial parallelism with the roll 265 is a bar 285 provided at its end zones with portions or projections 286 which engage respectively the bearing blocks 267, the spring 279 being tensioned to urge the bar 285 in a right hand direction as viewed in FIGURE 11 to bias the roll 265 into engagement with the roll 255 and the glass filaments or bodies, the tension or force of the spring 279 being transmitted to the bearing blocks 267 through the projection 282 on the sleeve 280 and the bar 285.

The tension in the spring 279 may be varied or adjusted by rotating the toothed wheel 277 in a counterclockwise direction as viewed in FIGURE 11, the spring being held in tensioned condition by means of a plate, detent or lock 288 engaging a recess in the wheel 277. The locking plate 288 is secured to one of the members 235 by means of a securing bolt 289.

The upper guiding means for the primary filaments is illustrated in detail in FIGURES 13 through 15, and includes plates 290 and 291. The plate or member 290 is formed with a series of juxtaposed V-shaped recesses 292, each of which has tapered or convergingly arranged walls 293.

The plate 291 is likewise formed with V-shaped recesses 295, and the recesses 292 and 295 when plates 238 and 239 are assembled, are in the relationship illustrated in FIGURE 13. Each of the tapered recesses 292 and 295 register with a parallel walled groove 297 in plate 291 as particularly shown in FIGURE 15.

The members 290 and 291 are secured together by means of accuring bolts 298. The end zones of plates 290 and 291 extend into suitable recesses formed in the members 235 and are held in place by threaded members 299. The V-shaped recesses 292 and 295 provide tapered entrances in the guide means to receive the glass bodies or filaments 225 formed by solidification of the streams 22. The filaments or bodies are guided by the grooves 297 to the nip zone between the feed rolls 255 and 265.

The filaments or bodies 225, as they move away from the feed rolls 255 and 265, are directed through the lower guide means 232 in suitable grooves 300 formed in plate 302 which is secured to a mating plate 303 by means of bolts 304. The guide plate 302 is equipped with a cooling means 305 arranged to provide a chamber or duct 308 adapted to accommodate a circulating cooling fluid such as water, compressed air or other fluid.

The cooling means or chamber may be formed by two plates 306 and 307 arranged in contiguous relation.

As shown in FIGURES 10 and 11, the outermost plate 307 of the cooling means assembly 305 is formed with a U-shaped raised configuration forming with plate 306 a duct or chamber 308 to accommodate a cooling fluid.

The U-shaped duct is provided at one end with an inlet tube 309, the other end being provided with an outlet tube 310. The tubes 309 and 310 may be connected by suitable pipes (not shown) with a supply of cooling fluid and pumping means for circulating fluid through the cooling or heat transfer chamber 308. The cooling plate assembly 305 may be secured to the plate 302 by means of bolts 309.

The plate 303 is also equipped with a cooling means means 312 of a character similar to means 305. An inlet tube 314 and an outlet tube 315 are provided for conveying cooling fluid into and away from the cooling means 312. The lower portion of the plate 302 may be equipped with additional cooling means 318 connected with an inlet pipe 320 which is in communication with a supply of cooling fluid, such as water, for circulation through the chamber 319 of the cooling means 318. The chamber 319 is connected with an outlet pipe 322 to convey the water away from the chamber.

Through the arrangement shown in FIGURES 10 through 12 the filaments or bodies of glass are continuously advanced toward the attenuating blast by the feed rolls 255 and 265 and are properly guided and delivered endwise into the blast by the lower guide means 232. The guide means 232, being cooled by a circulating cooling medium and thus held within safe operating temperatures, may be positioned with its filament discharge zone close to the gaseous attenuating blast so that the substantially solid filaments or bodies may be projected into the core of the blast, the advancing ends of the filaments being softened by the heat of the gases and the softened material attenuated to fibers by the velocity of the blast.

It should be noted that a groove or passage in the guide means is provided for each filament or body so that the filaments or bodies on entering the blast are in spaced relation. Through this arrangement each individual filament or body is acted upon by the gases of the blast to be thereby individually attenuated into fibers. The guide means and the feed means are arranged to accommodate the filaments or bodies in a single plane transversely of the blast so that each filament is attenuated by gases moving at substantially the same velocity whereby the fibers may be maintained within a predetermined size range.

The quality of fibers formed from mineral material and especially from glass is in a measure dependent upon the homogeneous and uniform character of the molten material from which the primary filaments are formed. In the apparatus disclosed, the feeders 15 associated with the forehearth 10 are provided with means to render the molten material more homogeneous and susbtantially free of particles of refractory, cords and the like before discharge of the molten material from the feeders.

Each of the feeders 15 is equipped with one or more screens or foraminous elements for preventing discharge of cords, particles, of refractory and lumps of unhomogenized glass or mineral material from the feeder. The screens are adapted to temporarily retain the lumps, cords or particles of refractory in the zone of flow of the glass or other mineral material until they are disintegrated or dissolved in the flowing material.

As particularly show in FIGURE 4, there is disposed between the side walls of each feeder 15 a screen or foraminous element 330 which may be of multiple V-shaped configuration as illustrated.

The edge zones 332 of the screen 330 overlap and engage the edge zones of a plate 334 forming part of the feeder 15. The screen or element 330 is provided with a large number of comparatively small openings 335 through which flows the homogenized or fined glass or mineral material.

If desired, a secondary screen or foraminous element 340 of generally basket-shaped configuration, the components of which are generally U-shaped, may be disposed beneath the multiple V-shaped screen 330 to further refine the glass before it is discharged through the tips or orifice members 20. The secondary screen 340 has its intermediate zones spaced away from the depending apex zones of the primary screen 330 to facilitate flow of glass or other mineral material between the primary and secondary screens. The primary screen may be additionally supported by means of metal wires or rods 342 as shown in FIGURE 4. The central horizontal portions of the rods 342 pass through openings in the central portions of the secondary screen 340 so as to assist in supporting the secondary screen.

The primary and secondary screens are formed of high temperature resistant metal or alloy, such as platinum rhodium or the like in order to withstand the intense heat of the molten glass or mineral material. The openings 344 in the secondary screen may be a size the same or smaller than the openings 335 in the primary screen, dependent upon the glass composition utilized and the degree of homogeneity desired for the glass. The holes or openings in the screen members 330 and 340 should be of a size to provide for adequate flow of molten glass of homogeneous character through the openings but the retard movement or interrupt the passage of particles of refractory or cords through the screen elements.

By disposing the side wall portions of the screen members at comparatively steep angles as shown in FIGURE 4, a large perforated surface area is provided so that partial obstruction of the openings in the screen members by particles of refractory or cords will not unduly restrict or reduce the flow of molten glass through the remaining portions of the screen whereby an ample supply of glass is provided for the outlets or orifices 20.

Particles of refractory, cords or other unhomogenized material will be lodged in the trough-like zones of the screens and remain in the path of the material flowing through the screen. Due to the flow of molten material or glass over the particles of refractory and cords, the same are eventually disintegrated, dissipated or dissolved in the molten glass by reason of the high temperature in the feeder and continuous attrition by the flowing glass.

By way of example, it has been found that a preforated metal sheet or screen having approximately one-hundred-eighty-one holes or openings to the square inch, each of .055" in diameter, provides a satisfactory filter or screening medium for most glass compositions maintained at temperatures of about 1750° F. As hereinbefore indicated the openings 344 in the secondary screen or member 340 are preferably made smaller than the openings 335 in the primary screen 330. The molten glass or other molten mineral material discharged through the tips or orifice members 20 is thoroughly fined and refined so that the primary filaments formed from the streams of glass are of substantially uniform size and free of particles of refractory or other nonhomogeneous material.

FIGURES 17 through 19 illustrate a form of terminal clamp or connector construction 27 especially adapted for establishing an efficient and effective electrical connection between a current supply buss bar and the glass feeder or bushing associated with the forehearth 10. The terminal clamp or connector block 351 is made of metal having good current conducting characteristics such as copper, brass or the like, is connected with a buss bar 352 by means of bolts 354. The terminal clamp is formed with a portion 356 provided with a slot or kerf 358 as shown in FIGURES 17 and 19.

An upper zone of the portion 356 is formed with a slot 360 of greater width to accommodate a terminal member 25 formed as an integral projection extending from the feeder 15. Disposed above the slot 360 is a pair of contacts or bars 362 disposed in recesses and which are arranged to engage opposite planar surfaces of the terminal member 25. The bars or members 362 are formed of heat resisting material having efficient current conducting characteristics for establishing good electrical contact with the feeder terminal 25.

The block 351 is equipped or provided with an arrangement for effectively clamping or securing the bars 362 with the terminal clamp 25 under conditions of extreme variations in temperature. The block 351 is formed with slots 365 and 367. The slot 365 is in communication with a slot 367 which parallels the slot 358. The portion 370 of the block disposed between the slots 358 and 367 may be flexed by reason of the reduced section provided by the slots 358 and 367.

Through this arrangement the portion 370 is capable of being flexed in order to effect a clamping engagement of the bars 362 with the terminal 25.

The portion 370 of the terminal block 351 is provided with a transverse bore in which is disposed a cylindrical member 372 having a threaded opening 374 adapted to accommodate the threaded portion 375 of a bolt or clamp adjusting member 377. Threaded on the portion 375 of the adjusting means or bolt 377 is a nut or abutment member 379 which is disposed in the slot 366. After the nut 379 is assembled on the bolt 377 to the position shown in FIGURES 17 and 18, a pin or cotter key 380 is inserted through aligned openings in the nut and the bolt to secure these elements together.

In assembly, the cylindrical member 372 is inserted in the bore in portion 370 and the nut 379 inserted in the slot 366. The bolt or terminal clamping means 377 is inserted in an angularly disposed smooth bore 382 in the member 351 and the portion 375 threaded through the nut 379 and into the threaded opening in the cylindrical member 372. With the end zone of the bolt 377 extending partially through the opening in the cylindrical member 372 as shown in FIGURES 18 and 19, the key or nut locking member 380 is inserted through registering openings in the nut 379 and bolt 377 to secure the nut 379 on the bolt.

The bolt 377 is provided with a polygonally shaped head 381 to receive a suitable tool for rotating the bolt. Rotation of the bolt 377 in the proper direction, after the nut 379 has been secured to the bolt, establishes pressure or bias on the cylindrical member 372 to flex portion 370 of the block into clamping engagement with the feeder terminal 25.

In this manner an efficient electrical coupling or contact is assured between the bars 362 of the terminal clamp and the terminal 25 to facilitate effective flow of electrical energy through the terminal clamp and the feeder 15. Sufficient current is supplied through the terminal clamps 27 and the terminals 25 to heat the glass in the feeders to maintain the molten glass at the proper temperature or viscosity desired.

As the terminal clamps 27 are utilized in zones of intense heat adjacent the feeders 15, cooling means is provided for maintaining the terminal blocks at safe operating temperatures. To this end the portions 356 and 370 of the block 351 are provided respectively with cooling chambers 385 and 386 in the form of cylindrical bores disposed at each side of the slot 358 as particularly shown in FIGURE 19. Communication is established between the chambers 385 and 386 by a passage 388 formed in the block, the entrance end being threaded to receive a plug 390.

The entrances to the chambers 385 and 386 are threaded to receive respectively fittings 392 and 393. Secured to fitting 393 is a tube or hollow member 395 which extends into the cooling chamber 385, the open end of which is spaced from the end zone of the chamber. A tube or hollow member 397 similar in shape to tube 395 is secured to the fitting 392 and its open end is spaced from the end zone of the cooling chamber 386. The tubes 395 and 397 are of substantially smaller diameter than the diameters of the cooling chambers 385 and 386 to facilitate flow of cooling fluid or medium between the walls of the tubes and the walls of the cooling chambers.

The fitting 393 is equipped with an inlet tube or pipe 399 and the fitting 392 is equipped with an outlet pipe or tube 400. The inlet tube 399 may be connected with a supply of cooling medium or coolant such as water, compressed air, or other fluid having heat absorbing characteristics suitable for reducing or controlling the temperature of the terminal clamp device 27, the tube 400 being arranged to convey the coolant or cooling medium away from the terminal clamp. The cooling medium or fluid is supplied under pressure to the inlet pipe 399 and flows in the direction of the arrows viz. upwardly through the tube 397, downwardly through the passage provided between the exterior wall of the tube and the cylindrical wall of the chamber 386 through the transversely arranged passage 388, upwardly through the passage provided between the exterior wall of the tube 395 and the cylindrical wall of chamber 385, thence downwardly through the tube 395 and away from the terminal block. Through this arrangement the temperature of the terminal block or clamp 27 may be maintained and controlled at a safe operating temperature. It is to be understood the fluid flow through the chambers and tubes may be reversed if desired.

A comb roll 242 shown in FIGURES 1, 3 and 5 is provided for each group of primary filaments from a feeder. The comb roll serves to bring the primary filaments into a single plane and to establish a direction of movement for the primary filaments so that they will properly enter the upper guide 230 shown in FIGURE 11. As shown in FIGURE 1, each comb roll may be supported by fittings 402 adjustaby mounted upon brackets 404. Each bracket 404 is adjustaby supported through the medium of pairs of bars 405 and 406 connected together by means of connectors or bolts 407.

The bars 406 may be carried by means (not shown) mounted upon the end plates 238. Through the range of adjustment provided by the mounting means for the comb roll, the latter may be positioned to assure the proper delivery of the primary filaments into the filament guiding and feeding means.

A modified form of the blast producing means and method of forming a sheet-like blast is illustrated in FIGURES 20 through 22. In the modified arrangement, a plurality of combustion zones or chambers are contained in a single casing or burner and the burned gases forming the blast are projected through a continuous or uninterrupted elongated slot or orifice. The blast producing means shown in FIGURES 20 through 22 is inclusive of a burner construction formed with a single casing 410 of generally rectangular configuration elongated in the direction of its width.

The burner casing 410 is preferably made of metal such as iron or steel and encloses a plurality of combustion chambers or zones 412, there being four chambers in the illustrated embodiment. The top and bottom zones of the casing 410 are lined with layers 415 of high temperature resistant refractory and the combustion zones or chambers 412 are defined by partitions 420 and end walls 417 formed of refractory.

The rear wall 413 of each of the combustion chambers or zones 412 is formed with circular openings in which are disposed circular elements 414, the latter being perforated or provided with a large number of small passages for conveying fuel mixture into each of the combustion zones 412.

Disposed rearwardly of the burner casing 410 is a manifold casing 424 formed of metal and having flanged portions 426 secured to flanges 428 formed on the burner casing 410. The manifold casing 424 is formed with a plurality of manifold chambers 430, each chamber 430 being separated from the adjacent combustion zone 412 by means of the wall and fire screen constructions 413 and 414.

The manifold casing 424 adjacent each manifold chamber 430 is formed with a boss portion 432 to which is secured a tube 434 and L 435 connected with a flexible tube 90' in the manner similar to that shown in FIGURE 1. The mixture delivered to the individual chambers 412 may be controlled by valves of the character shown at 92 in FIGURE 1 and is under comparatively low pressure of from three to ten pounds per square inch.

Secured to the burner casing 410 is an orifice construction 438 which includes a metal portion 440 lined with refractory 442. The construction 440 is formed with an orifice in the form of an elongated, thin slot 444 which extends substantially the width of the burner casing and through which gases from the combustion chambers 412 are discharged as an intensely hot high velocity gaseous blast of a temperature of 3000° F. or more. Due to the uninterrupted character of the slot which is of narrow thickness, a sheet-like attenuating blast is provided of a width substantially equal to the width of the burner casing.

The orifice construction 440 in which is formed the orifice 444 is provided with chambers 447 and 448 arranged respectively above and beneath the orifice 444, the chambers being in communication at their ends by means of passages 450. Arranged centrally of the orifice construction are inlet and outlet tubes 452 and 453 for conveying cooling fluid or medium such as compressed air, water, steam or other suitable fluid for controlling the temperature of the orifice construction to maintain the same within safe operating temperatures.

The provision of individual combustion chambers 412 is desirable in order that the velocities of the burned gases projected through the orifice 444 will be substantially uniform throughout the width of the discharge orifice so that fibers attenuated by the blast will be of substantially uniform size and character. To obtain uniform gas velocities, the mixture is preferably burned within the combustion zones or chambers 412 in a manner whereby substantially equal amounts of fuel are continuously consumed in each of the chambers 412. Pressures are developed in the chambers 412 as the burning gases undergo great expansion prior to their discharge as a high velocity blast. Effective results may be attained by disposing the forward edge zones of the partition wall 420 about one third of the distance from the orifice to the rear burner wall and configurating the edge zones 421 of the partition walls to a streamlined shape embodying a curved end zone, the curvature of which blends with the planar wall portions of the partitions 420 as shown in FIGURE 21.

Such configuration facilitates a smooth or streamlined juncture of the gases from adjacent chambers prior to the discharge of the gases from the orifice or slot 444. Through this arrangement a continuous sheet-like blast is projected from the burner orifice, the blast being of a character wherein the velocities in all zones of the blast are substantially the same.

The ratio of the cross sectional area of the orifice to the combined cross sectional areas of the combustion chambers 412 may be between 1 to 4 and 1 to 12.

With this form of blast producing means the primary filaments 225' formed from the streams 22' of glass or other mineral material discharged from the feeders 15' pass over a single comb roll 455 and are advanced by feed rolls and pass through fiber guiding means 456 of the general character shown in FIGURES 10, 11 and 12.

The guide means and filament feeding rolls may be fashioned as a single unit extending parallel with the orifice 444 and of a length substantially equal to the width of the burner casing. The primary filaments 225 are directed through the guide means so that all of the primary filaments, when advanced endwise into the blast emanating from the orifice 444 are spaced substantially equal distances apart whereby the intensely hot high velocity blast softens each individual primary filament 225' and attenuates the softened end of each filament to fine fibers without impairment by adjacent primaries.

The construction shown in FIGURES 20 through 22 is advantageous in making wide mats of fibers, the fibers being attenuated by a continuous uninterrupted sheet-like blast of gases of a transverse dimension substantially equal to the width of the mat to be formed from the collected fibers. Furthermore, a mat formed of fibers attenuated through the use of an uninterrupted sheet-like blast will be substantially uniform in all areas or zones thereof as the attenuation of the primary filaments to fibers takes place throughout the width of the blast under substantially the same operating conditions in all zones of the blast.

The burner arrangement shown in FIGURES 20 through 22 may be mounted upon a bar 126' supported in the same manner as the bar 126 shown in FIGURES 6 and 7. Mounted upon the bar 126' is a plate 174' formed with an upwardly extending portion 175'. A second plate 179' is formed with depending projections which are pivotally connected to the projection 175' by means of a shaft 177'.

A threaded member 180', welded to or otherwise carried by the plate 174', is equipped with nuts 182' as shown in FIGURE 20 for adjusting the position of plate 179' about the axis of shaft 177'. Through this arrangement the burner construction may be angularly adjusted in a plane normal to the direction of the blast.

The plate 179' supports upwardly extending members 197' one of which is shown in FIGURE 20 upon which is mounted a plate 199' having a boss portion 200' bored to receive a post or shaft 205'. The post 205' is secured to a plate 207', the latter being directly connected to the burner construction. A worm wheel 210' has a threaded bore which receives the threaded portion of the post 205' whereby rotation of the worm wheel in a proper direction elevates or lowers the post 205' and the burner carried thereby.

A shaft 213' equipped with a worm 216' is arranged to rotate the worm wheel 210' for raising and lowering the burner in the same manner as the apparatus shown in FIGURES 6 and 7. The angularity of the blast lengthwise of the burner may be adjusted or determined by adjusting the angular position of the burner through mechanism shown in FIGURES 6 and 7 for adjusting the relative angularity of the burner supporting channel 126.

A means of collecting the fibers attenuated by the blast is illustrated in FIGURE 1. Journally supported upon a frame member 460 is a shaft 462 carrying a roller 464. The roller 464 in conjunction with other rollers (not shown) support a foraminous endless conveyor or member 466. The conveyor 466 is driven through suitable means associated with one of the supporting rollers whereby the upper flight 467 of the conveyor is moved in a lefthand direction as viewed in FIGURE 1 away from the fiber attenuating zone.

The upper flight 467 provides a collection or deposition zone receiving the fibers which are entrained in the attenuating blast. Disposed beneath the upper flight 467 of the conveyor is a suction box or chamber 469 connected with a source of suction (not shown) by means of a pipe or tube 470. A subatmospheric pressure is thereby established in the chamber 469 beneath the upper flight 467 of the foraminous conveyor.

Through this arrangement the attenuated fibers are directed onto the conveyor and a large portion of the spent gases of the blast are conveyed away through the tube 470. The fibers are accumulated in a mat M to the desired thickness, the thickness being regulated by varying the speed of movement of the conveyor or by varying the rate of delivery of glass bodies or filaments to the attenuating blast. The conveyor may be of a width to accommodate collection of the fibers in mat formation of a width substantially equal to the combined widths of the burners shown in FIGURE 3, or the width of the elongated orifice 444 of the burner shown in FIGURE 20.

In carrying on fiber attenuating operations with the apparatus illustrated in FIGURES 1 and 3, the combustion chambers of the burners 60 are disposed close together so that the gas streams emanating from the elongated orifices 70 provide a sheet-like blast which is substantially continuous in its transverse dimension. In the arrangement shown in FIGURE 20, the sheet-like blast formed by the gases projected through the single elongated orifice 440 provides a blast of width of a mat desired to be formed from the attenuated fibers.

The arrangements shown in FIGURES 1, 3 and 20 may be utilized to form mats of widths of four feet or more and in a practical application of the burner arrangement shown in FIGURES 1 and 3, each slot or orifice 70 is twelve inches or more in width. The high velocity streams of burned gases from the battery of burners or combustion chambers exemplified in FIGURE 3 produce a mat of approximately five feet in width, in which each burner slot is approximately twelve and three-quarter inches in width.

A mat of comparable or greater width may be formed directly from attenuated fibers from the high velocity stream or blast of burned gases projected through the orifice 444, the width of the mat being substantially equal to the width of the orifice 444. Through the use of the forms of apparatus disclosed, the fibers forming a mat are attenuated under substantially constant conditions and blast characteristics wherein the gases in all zones of the attenuating blast engage the primary filaments of fiber-forming material while moving at substantially the same velocities, this feature providing for the exercise of accurate control over the size range of fibers formed by the blasts.

If desired, a suitable binder or bonding agent may be projected onto the fibers in order to establish a degree of mass integrity in the mat M formed from the fibers. One method or means of distributing binder is shown in FIGURE 1. Manifolds 475 and 476 supported by the brackets or upwardly extending members 238 of the frame construction may be connected with a supply of bonding agent. Connected to the manifolds are tubes 478 equipped with nozzles 480 through which the binder may be sprayed or discharged onto the newly formed fibers as they move toward the collecting zone provided by the upper flight 467 of the conveyor. The binder may be discharged in the form of a liquid or, if desired, powdered or comminuted binder may be discharged onto the fibers through the use of streams of compressed air or other binder conveying medium. The binder impregnated mat M may be passed through an oven or heating zone to set or cure if a thermo-curable binder is utilized. It is apparent that, within the scope of the invention, modifications and different arrangements may be made other than is herein disclosed, and the present disclosure is illustrative merely, the invention comprehending all variations thereof.

What we claim is:

1. Apparatus for forming fibers from heat-softenable mineral material including, in combination, feeder means for flowing groups of streams of fiber forming mineral material, a frame disposed beneath the stream feeding means, burner means providing a plurality of walled combustion chambers arranged in juxtaposed, transversely disposed relation, means for conveying combustible mixture to said combustion chambers, said mixture adapted to be substantially completely burned within said chambers, restricted orifice means formed in the front wall of each of the burners through which the burned gases are discharged as a high velocity sheet-like blast, arcuately shaped track means mounted upon said frame, the curvature of the track means being generated about an axis forwardly and above the orifice regions of said burners, a carriage mounted upon said arcuately shaped track means, drive means for adjusting the position of said carriage in a curved path provided by the arcuately shaped track means, means individual to each burner mounting the burners on said carriage, each of said burner mounting means being individually adjustable for rotating each burner about a vertical axis and for limited tilting movement thereof with respect to the carriage, means carried by the frame for attenuating the groups of streams to groups of solidified primary filaments, said means comprising pairs of filament engaging rolls, a pair of rolls being disposed above the orifice region of each of the burners, a rotatable shaft for driving the pairs of rolls, a guide means for each group of primary filaments arranged to guide the filaments of the groups into the gaseous blasts emanating from the combustion chambers whereby the heat of the gases of the blasts softens the extremities of the advancing primary filaments and the velocity of the gases of the blasts attenuates the softened extremities to fine filaments, and a foraminous endless conveyor having its upper flight moving in the general direction of flow of the gases of the blasts upon which the attenuated fibers are collected.

2. Apparatus for forming fibers from heat-softenable mineral material including, in combination, means for flowing groups of streams of fiber forming mineral material, a frame disposed beneath the stream feeding means, burner means providing a plurality of walled combustion chambers arranged in juxtaposed, transverse substantially aligned relation, means for conveying combustible mixture to said combustion chambers, said mixture adapted to be substantially completely burned within said chambers, restricted orifice means formed in the front wall of each of the burners through which the burned gases are discharged from the combustion chambers as a high velocity sheet-like blast, arcuately shaped track means mounted upon said frame, the curvature of the track means being generated about a horizontal axis forwardly and above the orifice regions of said burners, a wheeled carriage mounted upon said arcuately shaped track means, an arcuately shaped toothed rack secured to the carriage, a drive gear enmeshed with the teeth of the rack and arranged whereby rotation of the gear moves said carriage in a curved path provided by the arcuately shaped track means, means individual to each burner mounting the burners on said carriage, each of said burner mounting means being individually adjustable for rotating each burner about an axis and for limited tilting movement thereof with respect to the carriage, means for attenuating the groups of streams to groups of solidified primary filaments, said means comprising pairs of filament engaging rolls, a pair of rolls being disposed above the orifice region of each of the burners, a drive shaft for rotating the pairs of rolls, the drive shaft being disposed substantially coincident with the axis of curvature of the arcuately shaped track means, a guide means for each group of primary filaments arranged to guide the filaments of the groups into the gaseous blasts emanating from the combustion chambers whereby the heat of the gases of the blasts softens the extremities of the advancing primary filaments and the velocity of the gases of the blasts attenuates the softened extremities to fine filaments, and a substantial horizontal foraminous conveyor movable in the direction of flow of the gases of the blasts upon which the attenuated fibers are collected.

3. Apparatus for forming fibers from heat-softenable mineral material including, in combination, a forehearth adapted to contain a supply of molten mineral material, a plurality of feeders associated with the forehearth, each feeder having a plurality of orifices through which streams of the molten material are discharged, means for flowing an electric current through each of the feeders for controlling the viscosity of the material in the feeders, each of said feeders having projections formed thereon, means for securing current supply connectors in frictional contact with the projections, said connectors being formed with chambers arranged to receive a circulating coolant for controlling the temperature of the connectors, pairs of feed rolls engageable with the groups of solidified filaments formed from the streams, a drive shaft for said pairs of feed rolls, a plurality of internal combustion burners each having a combustion chamber formed with orifice means, said burners being arranged substantially in transverse alignment, means for feeding a combustible mixture into the chambers wherein the mixture is burned and the burned gases discharged through the orifice means of each burner as an intensely hot, high velocity composite sheet-like blast, said shaft being disposed forwardly and above the orifice means of the burners, guide means for each group of primary filaments for directing the advancing filaments endwise into the blasts whereby the heat of the gases thereof softens the extremities of the filaments and the softened material attenuated to fine fibers by the velocity of the blast, mounting means for the burners including a carriage, an arcuately shaped track supporting said carriage, the center of curvature of the track being substantially at the axis of the drive shaft for the feed rolls, each of said burners being supported on said carriage for independent limited universal adjustment for controlling the direction of the blast from each burner, and a relatively movable conveyor arranged for movement in the general direction of travel of the gases of the blasts upon which the attenuated fibers are collected.

References Cited in the file of this patent
UNITED STATES PATENTS

| | | |
|---|---|---|
| 2,663,906 | Labino | Dec. 29, 1953 |
| 2,687,551 | Stalego | Aug. 31, 1954 |
| 2,717,416 | Fletcher | Sept. 13, 1955 |